US006226568B1

(12) United States Patent
Tong et al.

(10) Patent No.: US 6,226,568 B1
(45) Date of Patent: May 1, 2001

(54) METHOD OF BALANCING PAINT BOOTH AIR FLOWS

(76) Inventors: Ernest Henry Tong, 44720 Patrick Dr., Canton, MI (US) 48187; Dimitar Filev, 23280 Mystic Forest Dr., Novi, MI (US) 48375; Yu-Ning Liu, 4985 S. Ridgeside Cir., Ann Arbor, MI (US) 48105

( * ) Notice: Subject to any disclaimer, the term of this patent is extended or adjusted under 35 U.S.C. 154(b) by 0 days.

(21) Appl. No.: 09/206,758

(22) Filed: Dec. 7, 1998

(51) Int. Cl.[7] .............................. G01M 1/38; B05B 15/12

(52) U.S. Cl. .............................................. 700/277; 454/52

(58) Field of Search ............................... 700/28, 38, 282, 700/277; 454/61, 52, 50

(56) References Cited

U.S. PATENT DOCUMENTS

| | | | | |
|---|---|---|---|---|
| 3,537,014 | | 10/1970 | Speth | 327/350 |
| 4,142,493 | | 3/1979 | Schira et al. | 123/568.21 |
| 4,345,921 | * | 8/1982 | Gustavsson et al. | 55/223 |
| 4,460,331 | * | 7/1984 | Robson et al. | 432/72 |
| 4,483,698 | * | 11/1984 | Kiichenthal et al. | 55/238 |
| 4,612,025 | * | 9/1986 | Sampey | 55/223 |
| 4,729,295 | * | 3/1988 | Osawa et al. | 98/115.2 |
| 4,840,116 | * | 6/1989 | Murakami | 98/115.2 |
| 4,884,215 | | 11/1989 | Zboralski et al. | 702/47 |
| 4,999,781 | | 3/1991 | Holl et al. | 701/108 |
| 5,095,811 | * | 3/1992 | Shutic et al. | 454/52 |
| 5,424,941 | | 6/1995 | Bolt et al. | 700/28 |
| 5,505,763 | * | 4/1996 | Reighard et al. | 95/19 |
| 5,535,814 | * | 7/1996 | Hartman | 165/22 |
| 5,555,195 | | 9/1996 | Jensen et al. | 700/276 |
| 5,559,407 | * | 9/1996 | Dudley et al. | 318/439 |
| 5,605,280 | * | 2/1997 | Hartman | 236/49.3 |
| 5,607,498 | * | 3/1997 | Reighard et al. | 95/19 |
| 5,820,456 | * | 10/1998 | Nelson | 454/52 |
| 6,139,421 | * | 10/2000 | Tong et al. | 454/52 |
| 6,146,264 | * | 11/2000 | Tong et al. | 454/52 |

* cited by examiner

*Primary Examiner*—William Grant
*Assistant Examiner*—Ronald D Hartman Jr.
(74) *Attorney, Agent, or Firm*—Damian Porcari

(57) ABSTRACT

A method of rapidly balancing air flows in a complex paint spray booth having a series of cells supplied by a common air flow that is pushed by an adjustable speed supply fan and then divided into downdrafts for each of the said cells accompanied by cross-flows between said cells. The downdrafts and cross-flows converging into exhaust flows drawn by an adjustable speed exhaust fan, the system having control elements for changing the downdrafts and/or cross-flows, and further having means for passing the exhaust flow through a waste paint water scrubber having an adjustable venturi gap width. The method comprising (a) setting an exhaust an speed and venturi gap width by correlating perturbed exhaust air flow rate data with a desired exhaust air flow rate at a desired exhaust pressure drop to establish a target fan curve as a function of pressure drop and exhaust flow rate, the setting for the exhaust fan sped and venturi gap width being derived from such curve; and (b) setting a supply fan speed and control position for each cross-flow damper by solving an objective optimization function for the sum of the cross-flows by using perturbed supply fan speed values and cross-flow rate values that establish distinct optimum cross-flow velocities at a specific air supply velocity from which the supply fan speed and cross-flow speed damper positions can be derived.

9 Claims, 4 Drawing Sheets

METHOD OF BALANCING PAINT BOOTH AIR FLOWS

TECHNICAL FIELD

This invention relates to the technology for balancing air flows and pressure drops throughout a series of interconnected painting cells of a conveyorized paint shop or booth, and more particularly to a two-part balancing technique which first sets the exhaust flow parameters, and secondly sets the supply flow parameters to produce desired downdrafts and cross-flows within the shop or booth.

DISCUSSION OF THE PRIOR ART

A typical automotive paint spray booth contains a series of adjacent treating cells each having its own requirements for air flows therethrough. The large number of flow control elements (i.e. fans, dampers, exhaust venturi adjustment) which may be in series or in parallel, are used to create multiple down drafts and cross-flows which vary among the cells. To achieve balanced air flows through the entire paint booth, the prior art has essentially used a sequential technique wherein existing supply, exhaust and cross-flows volumes are measured and one or more parts of the control system is adjusted sequentially. After such one part is adjusted, the flows are then remeasured, and other parts of the control system are adjusted. These steps are repeated as often as necessary to approach a balanced condition. However, the system can never achieve absolute balance by this technique because adjustment of one part of the system always unbalances another part of the system. This then becomes a hunting approach which is not optimum in efficiency and results.

For example, in choosing a part of the system to first adjust, adjustment of the fan speed is often first attempted; linear fan speed assumptions are made (using the manufacturer's fan speed curves) which assumptions fail to take into consideration environmental and associativity effects on fan speed as a result of the system in which it is placed. If the supply or exhaust fan speed values are too high or to low, as a result of the first try, other guesses are made as to how the fan speed should be changed, which subsequent guesses lead to numerous try and fail adjustments, never attaining the optimum set of balanced air flows through the several cells.

SUMMARY OF THE INVENTION

It is an object of this invention to provide a method for rapidly balancing air flows in a complex paint spray booth, by use of perturbation data that will allow an operator to quickly set an accurate exhaust fan speed and venturi gap at each cell outlet, and thence to quickly set an accurate supply fan speed along with accurate damper positions to achieve a balanced cross-flow condition.

In a first aspect, the invention is a method of rapidly balancing air flows in a complex paint spray booth having a series of cells supplied by a common air flow that is pushed by an adjustable speed supply fan and then divided into downdrafts for each of the cells accompanied by cross-flows between the cells, the downdrafts and cross-flows converging into an exhaust flow drawn by an adjustable speed exhaust fan, the system having control elements for changing the downdrafts and/or cross-flows, and having means for passing the exhaust flow through a waste paint water scrubber having an adjustable venturi gap width, the method comprising;

(a) setting an exhaust fan speed and venturi gap by correlating perturbed exhaust air flow rate data with a desired exhaust air flow rate at-a desired exhaust pressure drop across the venturi gap to establish a target fan curve as a function of pressure drop and exhaust flow rate, the setting for the fan speed and venturi gap width being derived from such curve; and (b) setting a supply fan speed in positions for each cross-flow damper by solving an objective optimization function for the sum of the cross-flows by using perturbed supply fan speed values and cross-flow rate values that establishes, distinct optimum cross-flow velocities at a specific common air supply velocity from which supply fan speed and cross-flow damper positions can be derived.

In a second aspect, the invention is a method for more rapidly balancing air flows in a paint booth system having a series of cells supplied by an air flow that is pushed by an adjustable speed supply fan and then divided into downdrafts for each of the cells including cross-flows between cells, the downdrafts and cross-flows converging into an exhaust flow drawn by an adjustable speed exhaust fan, the system having control elements for changing the downdraft and/or cross-flows, and having means for passing the exhaust flow through a waste paint water scrubber having an adjustable venturi gap width, the method comprising; (a) changing the exhaust flow rate by (i) collecting exhaust flow data by choosing and calculating a target exhaust air flow rate, and then measuring the actual initial operating exhaust air flow rate, as well as measuring the initial operating pressure operating drop of the exhaust flow across the venturi gap width, (ii) finding an adjusted speed for the exhaust fan and an adjusted width for the venturi gap that meets the target exhaust volume air flow rate by correlating measured perturbed exhaust flow and perturbed venturi pressure drop data to the target and initial operating data for the exhaust flow and venturi, and (iii) setting the exhaust fan speed according to such findings, (b) changing the down drafts and cross-flows by (i) choosing and calculating data for target downdraft and cross-flow rates, as well as booth pressurization values, (ii) measuring actual downdraft and cross-flow rates and booth pressurization values, by perturbing one or more control elements to generate downdraft and cross-flow rate data, as well as booth pressurization data, (iii) calculating an optimized combination of control elements effecting downdrafts and cross-flows at a target booth pressurization, the calculations using an objective function to simultaneously satisfy all of the target downdrafts and cross-flow rates, and (iv) adjusting the control elements according to the optimized calculation to obtain a balanced system.

DETAILED DESCRIPTION AND BEST MODE

To maintain a continuously balanced control of all cross-flows, within a complex paint spray booth having several cells or zones, such flows must be maintained at prescribed target velocities despite fluctuations in supply or exhaust flows due to weather conditions, sludge build-up in the flow passages, changes in the building ventilation system or changes in any pressure gradient across the booth. Cross-flow velocities are usually changed by adjusting the fan speed for the supply flow and/or changing the flow split to the various cells or zones of the booth by adjusting cross-flow duct dampers. Identifying the proper combination of such settings for the supply fan speed and damper settings to achieve all target cross-flows is extremely complex and extraordinarily difficult to achieve because of the great number of variables involved. It is also difficult because other variables, such as exhaust fan speed and the influence of exhaust venturi gap width, have not usually been considered with the usual variables. Changes in one end of the booth will influence conditions at the other end of the booth making balancing by sequential steps or zones a crude approximation if not an impossibility.

Figure 1:
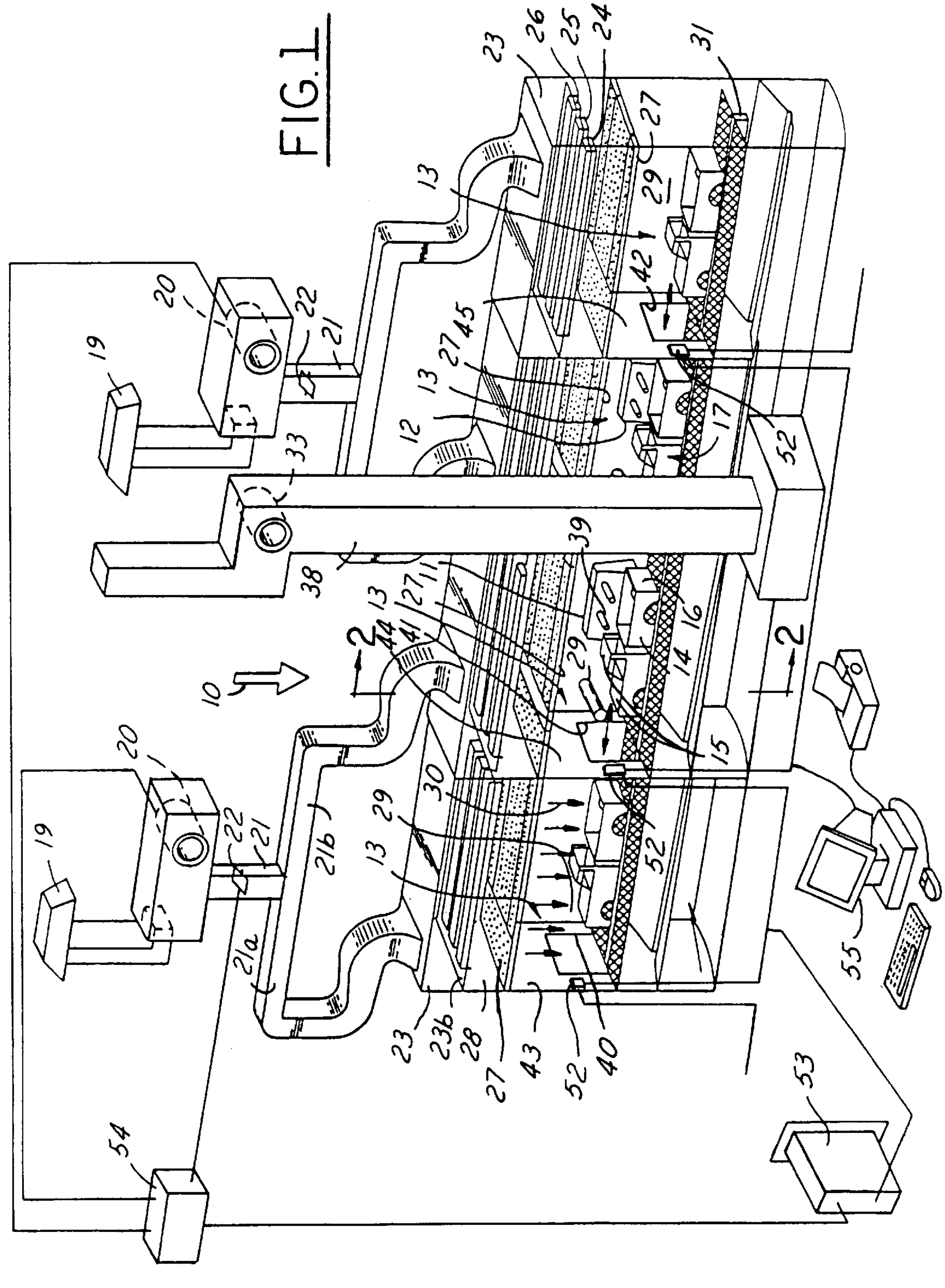
FIG. 1 is a perspective view of an automotive paint spray booth having multiple cells and complex air flow therethrough.

The apparatus elements of a complex automotive paint spray booth is schematically illustrated in FIG. 1. The booth assembly 10 employs electrostatic spray paint application modules 11 and 12 in some of the cells 13 of the assembly to carry out painting of side panels 14, top panels 15, and end panels 16 of vehicle bodies 17. Such painting is carried out with spray bells 39 (charged with 90,000 volts or more) having spray heads located relatively close to the target surfaces. Each interior working space 29 of each cell 13 is open and connected to an adjacent cell by way of large wall opens 18 through which the vehicle bodies can pass as they are continuously conveyed. A large volume of air passes through each cell 13 to carry away volatile emissions from the interconnected cells 13, the emissions containing varying amounts of suspended paint particles. Such emissions must be removed as mandated by federal regulations. To facilitate emission removal, a large quantity of air is not only pushed into assembly 10 through inlets 19 by powerful electrically powered supply fans 20, but withdrawn or sucked from such assembly by large powerful exhaust fans 33. The air is forced by such fans first through the ducts 21 (divided into duct work 21*a* and 21*b*) which may contain dampers 22 to effect control of the main airflow.

Figure 2:
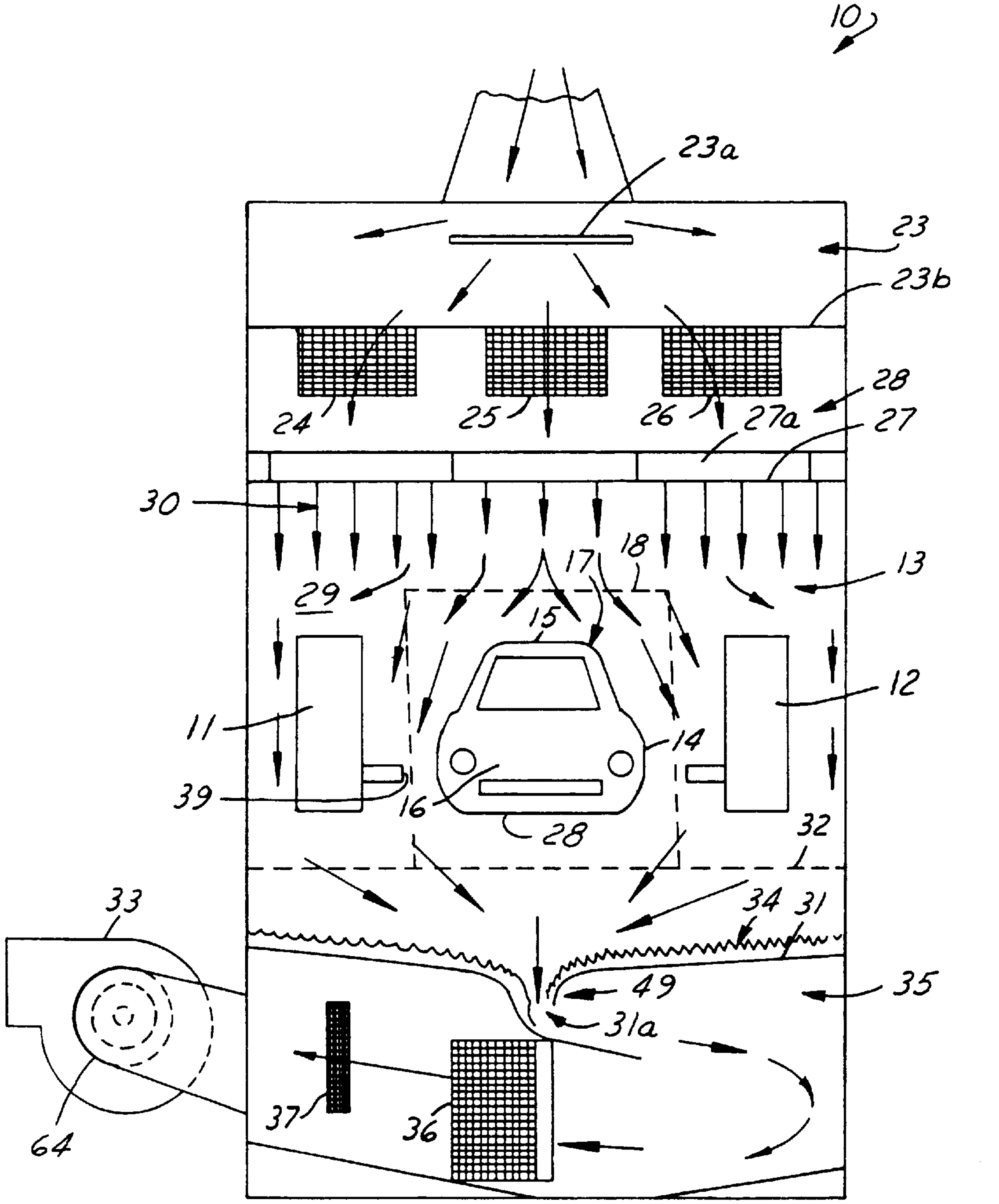
FIG. 2 is an enlarged schematic sectional view of one of the cells of the paint booth.

As shown more specifically in FIG. 2, the air flow is carried through an upper plenum 23 for each cell 13 where the airflow meets a diffuser plate 23*a* causing the airflow to be spread across the entire area of the upper plenum. A group of elongated bag-type filters (here, 24, 25, 26) hang from the bottom wall 23*b* of each cell plenum 23. After exiting from the bag-type filters, the air flows into and across a second or lower plenum 28 to meet a wall 27 that defines the top or ceiling of each chamber 29 for each cell. Wall 27 is usually constructed of steel mesh over which a synthetic low level air filtering media 27*a* is laid in a uniform single density, serving to distribute downward air flow generally uniformly across the entire ceiling of chamber 29. Air passed through such media creates a downdraft flow 30 (see downward arrows in FIG. 2) that wrap around the vehicle body 17 as well as around equipment, such as a spray module 11. The air flow is then sucked out through an elongated venturi slot 31a provided in a panel 31 beneath the mesh floor 32 of each cell 13. The panel 31 and venturi slot 31*a* are part of an air cleaning water scrubbing system 34 that consists additionally of means to provide a curtain of water washing across panel 31 that collects paint particles as they fall or are pushed by the air flows down onto such washing water. The mixture of water and air effluent from the scrubber 34 is then directed into a filter 36 residing in a bottom plenum 35; the air is then funneled through a mist separator 37 and sent up through an exhaust stack 38 to atmosphere as sucked by the exhaust fan 33.

Although paint spraying may not take place in each chamber or cell 13, paint emissions do migrate to adjacent chambers as a cross-flow, and as a result, damper control ports between cells, or as a result of openings 40, 41, 42 etc. in the separating upright walls 43, 44, 45 of the booth, which openings permit movement of vehicle bodies between cells by use of a transfer line 46. Accordingly, each chamber 29 must be cleansed of paint emissions and thus large air flows are sent through each cell.

Figure 3:
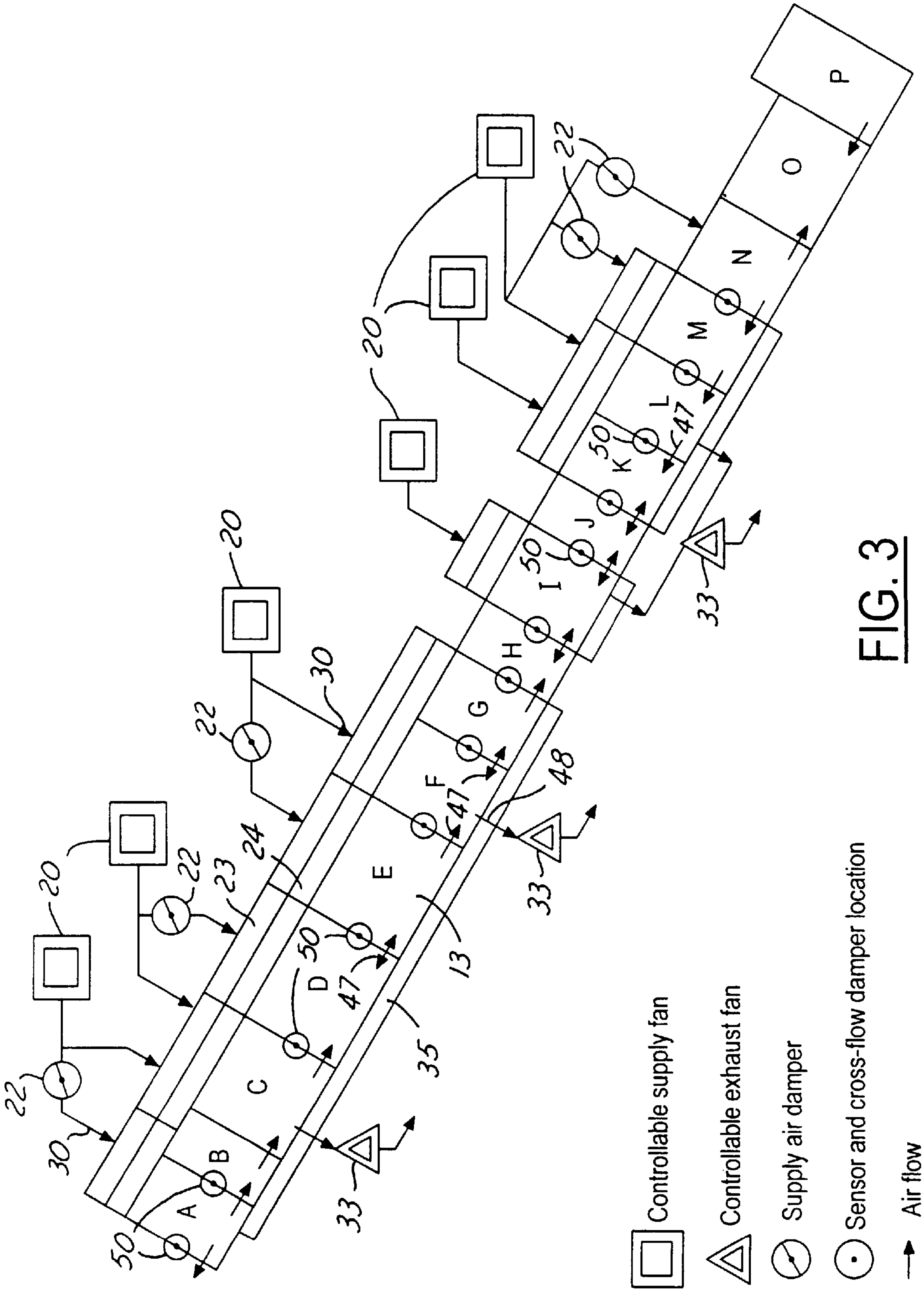
FIG. 3 is a schematic illustration of the type of controls associated with an automotive paint booth showing controls for cross-flows and adjustable speed fans (the latter requiring disassembly of the fan pulley sheaves)

The complexity of balancing the several downdraft flows 30, cross-flows 47 and exhaust flows 48 is illustrated in FIG. 3. A typical paint spray booth will contain a number of cells or zones 13 (such a A–P). Dampers 22 are used in most supply ducts. The cross-flows 47 must vary depending on the task to be carried out in a specific cell or zone, but the entire system must balance. For example, in cell A, the body panels to be painted are wiped down with tack rags to remove dust therefrom; in cell B, manually operated paint spray guns are used to coat hidden locations, such as under the hood or between cab and bed for a truck; in cell C, robotic paint spray heads cover interior locations such as inside door jams; in cell D, robotic paint sprayers cover special exterior surfaces such as the inside bed of a truck; in cell E, rotary paint spray bells are used to apply a base coat with a soft spray to exterior panels; in cell F, robotic reciprocating air spray atomizers are used to apply a base coat with a stronger force to the same exterior panels; in cell G, manually operated sprayers are used to apply the base coat to areas not reached in cells E and F; cell H is an empty tunnel used to allow the base coat solids to evaporate (flash off) before applying the final clear coat; in cell I, a soft spray of clear coat is applied robotically; cell J can be used to allow flash off, but usually is not needed; in cell K, robotic reciprocating spray heads are used to apply clear coat paint with a stronger force; in cell L, manually operated sprayers are used to apply the clear coat to areas not reached in cells I and K; cell M is an inspection zone; in cell N. flash off is allowed to occur (solvents evaporate); in cell O, infra-red heating is carried out usually at 300° F. and for only a period of time to promote a hard skin or surface on the painted panels; and in cell P, convection hot air heating is carried out to thoroughly dry the paint system.

It is desirable to reduce air volume passing through the booth by balancing the cross-flows, not only to reduce energy consumption but also to improve paint transfer efficiency. The process of this invention for balancing the complex automotive paint spray booth to rapidly satisfy all necessary operating criteria, consists of essentially two critical steps. First, there is an explicit technique for calculating the exact paint scrubber area and exhaust fan speed to produce a corrected exhaust air volume and pressure drop (through the paint booth exhaust scrubber). Second, a calculation scheme, embodied in computer software, is used to define the necessary adjustments to the supply fan speed and the cross-flow air dampers for producing the target downdraft and cross-flow velocities within the paint booth at the corrected exhaust flow and exhaust pressure drop.

The control aspects of the method of this invention may be implemented through a computer controlled balancing system. Low air flow sensors 52 may be used adjacent each cross-flow damper 50, the sensor providing accuracy in signaling air flow direction and air flow velocity (even in the low range of ±0.025 m/sec. Digital output of the sensors is sent to a microprocessor 53 which in turn converts the information for use by a programmable logic controller that adjusts the cross-flow dampers and venturi gap width. An operator interface with the controller can be attained through use of a desktop terminal personal computer 55 or through a remote terminal unit.

This systematic process rapidly obtains target parameters, down drafts, cross-flows, scrubber pressure drop and proper booth pressure by following such method in essentially two phases; (a) setting the speed of exhaust fan 33 and venturi gap 49 by creating perturbed exhaust airflow data with a desired air flow at a desired pressure drop to establish a target fan curve as a function of pressure drop and exhaust flow rate, the setting for the fan speed and venturi gap width being derived from such curve; (b) setting the speed of the supply fans 20 and positions for each of the cross-flow dampers 50 by solving an objective optimization function for the sum of the cross-flows 47 using perturbed supply fan speed values and cross-flow rate values, so that such solution establishes distinct optimum cross-flow velocities at a specific air supply velocity from which the supply fan speed and cross-flow damper positions can be derived.

Taking the first phase in more detail, the target downdrafts 30 and cross-flows 47 are first selected and based on paint process health and safety requirements. The target supply and exhaust volume flow rates are calculated knowing the plan area of each zone or cell 13. Next the actual operating supply, exhaust: and cross-flow volumes are measured to determine where the paint booth is currently operating. The booth supply volumes should be measured at the ceiling 27 of the booth using a conventional pressure rake or vane anemometer. Supply air volumes must include consideration of any ceiling blockage caused by the support structure. Cross-flows should be measured using an acoustic anemometer. A cross-flow measurement beneath the grate 32 and above the scrubber 34 is required if the area beneath the grate is not separated by partitions. The exhaust volume is calculated from the supply and cross-flow volumes. Scrubber pressure drop is measured by placing a pressure probe into the exhaust plenum 35. The exhaust air velocity out of the paint booth into the clean room is also measured; this indicates whether the booth is at a positive or negative pressure relative to its environment.

Figure 4:
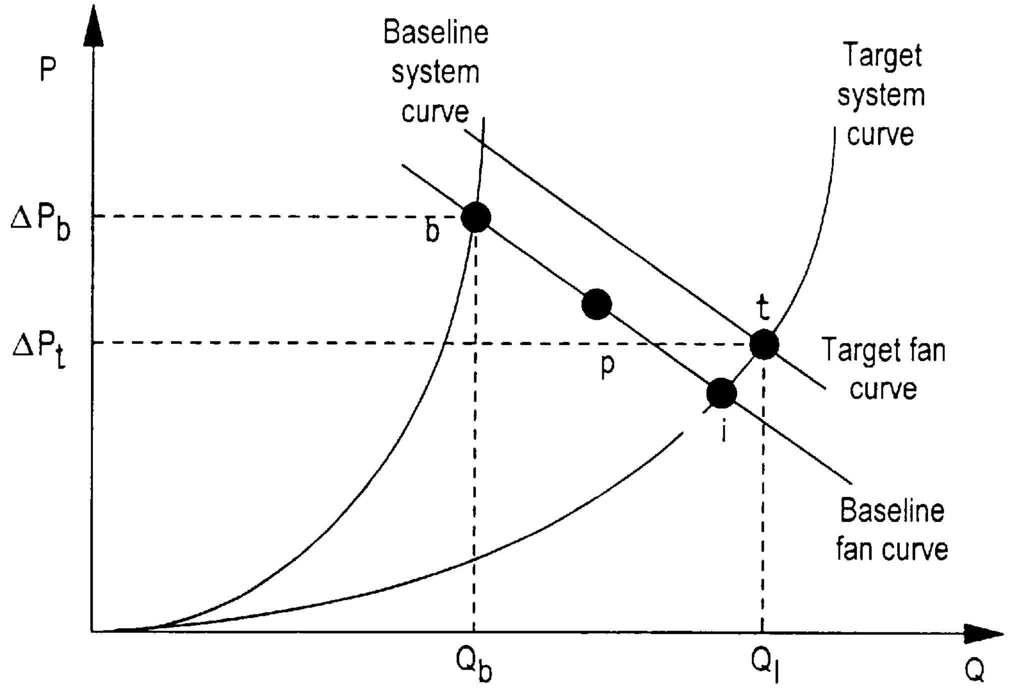
FIG. 4 is a graphical illustration of system and fan curves, plotted as a function of air flow rate and pressure drop.

The essential aspect of this first phase is to rapidly set the proper exhaust volume flow rate and scrubber pressure drop at the venturi slot by varying the width. Referring to FIG. 4, the first phase measures the base line pressure drop across the venturi ($\Delta P_b$) and air volume flow rate through the venturi ($Q_b$) to define the base line operation condition (point b in FIG. 4). A parabolic curve 60 is drawn through the base line point b, and the origin of the graph (point 0). This is the base line exhaust system curve. The equation for this base line system curve is $$\Delta P = \frac{\Delta P_b}{Q_b^2} Q^2$$

Mark a point t on the graph which represents the target venturi drop ($\Delta P_t$) and air volume flow rate ($Q_t$), and draw X a parabolic curve 61 through the target point t and the origin 0 to represent the target system curve for target exhaust operation condition. The equation for this target exhaust system curve is:

$$\Delta P = \frac{\Delta P_t}{Q_t^2} Q^2$$

Define the base line fan curve 62 by perturbing the physical system by way of shutting down water flow while keeping the exhaust fan running at the same speed and measuring the pressure drop ($\Delta P_p$) and air volume flow rate ($Q_p$) through the venturi. The Point p on the chart is then marked as the perturbation operation condition. A straight line is then drawn through the base line point (b) and the perturbation point (p) to simulate the fan curve 62 at the base line fan speed $rpm_b$. The equation of this line (representing the exhaust fan curve at the base line exhaust fan speed(rpm) is:

$$\Delta P = \left(\frac{\Delta P_b - \Delta P_p}{Q_b - Q_p}\right) Q + \left(\frac{\Delta P_p Q_b - \Delta P_b Q_p}{Q_b - Q_p}\right)$$

Define a target fan curve 63 by first finding the intersection point i of the base line exhaust fan curve 62 and the target exhaust system curve 61, and then calculating the air volume flow rate (Qi) at this point using the following equation:

$$Q_i = \frac{m + \sqrt{m^2 + 4kc}}{2k} \text{ and } P_i = kQ_i^2$$

$$\text{where } m = \left(\frac{\Delta P_b - \Delta P_p}{Q_b - Q_p}\right) \quad c = \left(\frac{\Delta P_p Q_b - \Delta P_b Q_p}{Q_b - Q_p}\right) \text{ and } k = \frac{\Delta P_t}{Q_t^2}$$

The pressure drop at $P_i = k^2{}_{Qi}$. The line 63 drawn through point t, must be parallel to the base line exhaust fan curve 62 to represent the target exhaust fan curve. Using the following fan law, calculate the target exhaust fan speed rpm, using points t and i data.

$$rpm_t = \left(\frac{Q_t}{Q_i}\right) rpm_b$$

The new sheave size 64 (see FIG. 2) for the exhaust fan an be determined according to this calculation for the target fan speed $rpm_t$. The pulley belt for the exhaust fan is moved to this new sheave position.

To determine the venturi gap width, the water and exhaust fan are shut down and turned off. The back section of the booth is entered and the venturi gap opening 49 is measured for the base line case $w_t$. The target venturi gap opening ($w_t$) is then calculated by using the following equation and data from points t and b, and the gap width is adjusted accordingly:

$$w_t = \left(\frac{Q_t \sqrt{\Delta P_b}}{Q_b \sqrt{\Delta P_t}}\right) w_b$$

After the fan is adjusted in speed by resheaving its pulley location and the venturi gap width according to such adjusted values, confirmation of the adjusted values can be obtained by measuring the pressure drop and air volume flow rate through the venturi ($\Delta P_{t'}$, and $Q_{t'}$). The target values $\Delta P_t$, $Q_t$ are then compared.

Figure 5:
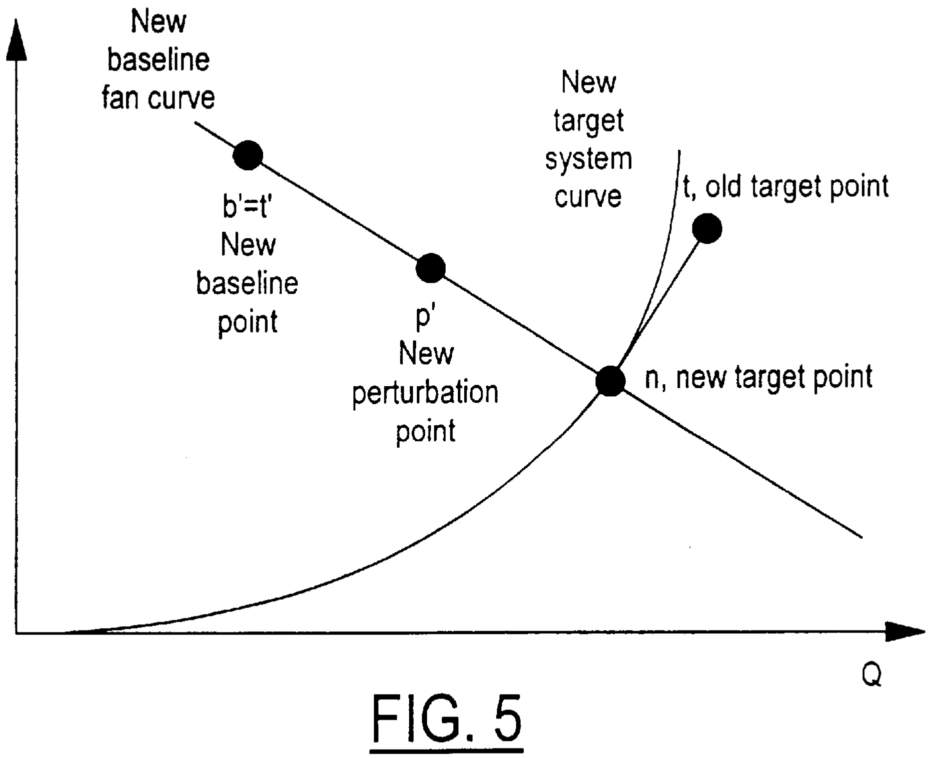
FIG. 5 is an enlarged graphical illustration similar to FIG. 4, but illustrating how the solution target points can be adjusted.

As shown in FIG. 5, in most of the cases, the points t and t' should be reasonably close to each other, ($\Delta P_{t'}$, $Q_{t'}$) being within 10% of ($\Delta P_t$, $Q_t$). If this is the case, no further action need to be taken. If point t' is further away than 10% from the target point t, make point t' as the new base line point b' and repeat perturbating the system to find a new base line fan curve. Then check if the original target point ($\Delta P_t$, $Q_t$) lies on this new base line fan curve or close to the curve. If yes, find an appropriate point on the new base line fan curve as the comprised target point. Then determine new venturi gap width. No fan resheaving is necessary in this case. If the original target point ($\Delta P_t$, $Q_t$) is extremely far away from the new base line fan curve, repeat determining a new target fan curve and determining new target fan speed, resheaving of the fan, determining the new venturi gap width and readjusting the venturi gap width until the target values are achieved.

With the exhaust fan speed and venturi gap width now set, we must set the supply fan speed and cross-flow dampers as the second phase. This is accomplished by solving an objective optimization function that simulates the supply air as it is divided within the booth. Perturbed data is put into the function for the variables, while concurrently solving for the different cross-flow velocities at a specific common air supply velocity. The fan speed for such supply velocity is then derived and set. Damper positions for the derived cross-flow velocities are also set.

In more detail, the second phase comprises obtaining the supply fan speed and cross-flows by identifying the proper combination of settings for such supply fan flows and the various cross-flow damper settings that will achieve all the target values. The entire paint booth is treated as a single system and the objective function permits solving for all the adjustments concurrently and thereby achieve the target parameters concurrently.

The sum of the pressure differences between adjacent zones of the booth must equal the pressure differences across the entire booth (pressure differences being a function of air velocity between cells and a loss coefficient). The problem can be represented as the following non-linear optimization function:

$$f_i(k_i)=(K_1V_1^2+K_2V_2^{2+}K_3V_3^2f\ldots K_nV_n^2)=\Delta P$$

Where $K_b$ is equal to the exp ($\lambda_1$), where $V_i$'s are the measured velocities at the zone boundaries, and $\Delta P$ is the measured pressure difference between the entrance and the exit of the booth. The equation is solved for various loss coefficients K at the zone boundaries. The additional parameter ($\lambda_1$) is introduced so that the K's are expressed as exponential functions of ($\lambda_1$) in order to obtain positive solutions of the K's.

Once the loss coefficients K are determined, a constrained optimization problem is solved to determine a feasible set of cross-flow velocities:

$$\text{Minimize: RMS error} = \frac{\sqrt{\sum (V_i - V_{it})^2}}{N}$$

Subject to:

$$(K_1V_1^2+K_2V_2^2+K_3V_3^2\ldots K_nV_n^2)=\Delta P$$

Where $V_i$'s are the feasible set of velocities to be determined from the above problem and $V_{it}$'s are the corresponding target values, N is the total number of cross velocities under consideration and $\Delta P$ again is the measured pressure difference between the entrance and exit of the booth. From this feasible set of velocities, air supply to the zones can be determined after performing the volume balance for each zone. Knowing the duct sizes, present supply air flow volumes and present supply fan speeds, it is possible to determine the approximate damper and supply fan rpm settings assuming a linear proportional relationship between the flow volume through a duct and a corresponding duct size, and between the supply volume and fan rpm.

To provide a more precise determination of the supply fan or damper setting, a Jacobean Sensitivity Matrix may be used to define the responses of each of the cross-flow velocities to a change in one of the independent parameters. The Jacobean is first defined by systematically perturbing the system and measuring the responses carried each time the system independent parameters are changed, the Jacobean is updated using the Broyden method. By continuously updating the Jacobean, the controller always has the knowledge of the true response of the system or facility. Once the Sensitivity Matrix is determined, adjustments to the independent variables are calculated by minimizing the error function (being the difference between the measured value of V and the target value). This is similar to using a derivative approach to finding the minimum of a continuous function. In this case, minimizing the objective function means minimizing the error function (the difference between the measured and target values of V).

While certain embodiments of the present invention have been described in detail, those familiar with the art to which this invention relates will recognize various alternative designs and embodiments for practicing the invention as defined by the following claims.

What is claimed is:

1. A method of rapidly balancing air flows in a complex paint spray booth having a series of cells supplied by a common air flow that is pushed by an adjustable speed supply fan and then divided into downdrafts for each of the said cells accompanied by cross-flows between said cells, the downdrafts and cross-flows converging into exhaust flows drawn by an adjustable speed exhaust fan, the system having control elements for changing the downdrafts and/or cross-flows, and further having means for passing the exhaust flow through a waste paint water scrubber having an adjustable venturi gap width, the method comprising:

(a) setting an exhaust fan speed and venturi gap width by correlating perturbed exhaust air flow rate data with a desired exhaust air flow rate at a desired exhaust pressure drop to establish a target fan curve as a function of pressure drop and exhaust flow rate, the setting for the exhaust fan speed and venturi gap width being derived from such curve; and (b) setting a supply fan speed and control position for each cross-flow damper by solving an objective optimization function for the sum of the cross-flows by using perturbed supply fan speed values and cross-flow rate values that establish distinct optimum cross-flows velocities at a specific air supply velocity from which the supply fan speed and cross flow speed damper positions can be derived.

2. The method as in claim 1, in which the objective optimization function for step (b) is as follows:

$$f_i(k_i)=(K_1V_1^2+K_2V_2^2+K_3V_3^2f\ldots K_nV_n^2)-\Delta P$$

where K=exp($\lambda_1$), $V_i$ is a measured velocity at a zone boundary and $\Delta P$ is a measured pressure difference between an entrance and exit of the booth.

3. The method as in claim 1 in which the exhaust fan speed and venturi gap width are derived from the equations:

$$Q_i = \frac{m + \sqrt{m^2 + 4kc}}{2k} \text{ and } P_i = kQ_i^2$$

$$\text{where } m = \left(\frac{\Delta P_b - \Delta P_p}{Q_b - Q_p}\right) \; c = \left(\frac{\Delta P_p Q_b - \Delta P_b Q_p}{Q_b - Q_p}\right) \text{ and } k = \frac{\Delta P_t}{Q_t^2}.$$

4. A method for more rapidly balancing air flows in a paint spray booth system having a series of cells supplied by an air flow that is pushed by an adjustable speed supply fan and then divided into downdrafts for each of the cells including cross-flows between the cells, the downdrafts and cross-flows converging into an exhaust flow drawn by an adjustable speed exhaust fan, the system having control elements for changing the downdrafts and/or cross-flows, and having means for passing the exhaust flow through a waste paint water scrubber having an adjustable venturi gap width, the method comprising:

(a) changing the exhaust flow rate by (i) collecting exhaust flow data by choosing and calculating a target exhaust air flow rate, and then measuring the actual initial operating exhaust flow rate, as well as measuring the initial operating pressure drop of the exhaust flow rate across the venturi gap width; (ii) finding an adjusted speed for said exhaust fan and an adjusted width for said venturi gap that meets the target exhaust volume air flow rate, by correlating measured perturbed exhaust flow and perturbed venturi pressure drop data to the target and initial operating data for the exhaust flow and venturi, and (iii) setting the exhaust fan speed according to such findings; and (b) changing the downdrafts and cross-flows by (i) choosing and calculating data for target downdrafts and cross-flow rates, and booth pressurization values; (ii) measuring actual downdrafts and cross-flow air flow rates and booth pressurization values by perturbing one or more control elements to generate downdraft and cross-flow rate data as well as booth pressurization values; (iii) calculating an optimized combination of control elements effecting downdrafts and cross-flows at a target booth pressurization, the calculation using an objective function simultaneously to satisfy all of the target downdrafts and cross-flow rates; and (iv) adjusting the control elements according to the optimized calculations to obtain a balanced system.

5. The method as in claim 4, in which step (a) (ii), for changing the exhaust flow rate, is carried out by generating a target system curve of venturi pressure drop as a function of air volume flow rate and generating a fan curve using a combination of measured perturbed data for exhaust flows and pressure drops, and then after locating the intersection of said curves, calculating the target exhaust fan speed by ratioing a selected target fan flow rate to the flow rate at said intersection, and calculating the target venturi gap by rationing the product of measured exhaust flow rates and the square root of measured venturi pressure drops to the product of the target flow rate and the square root of the venturi pressure drop.

6. The method as in claim 4, in which the objective function is represented by the sum of pressure differences between adjacent cells which must equal the pressure differences across the entire booth, with pressure differences between cells being a function of air velocity between cells and a loss coefficient K, and where the determined feasible set of cross-flow velocities is calculated by using the constrained optimization of the following equation:

$$f_i(k_i) = (K_1V_1^2 + K_2V_2^2 + K_3V_3^2 f \ldots K_nV_n^2) - \Delta P$$

wherein the equation is solved by simultaneously calculating cross-flow velocities, the exhaust flow rates and the supply fan speed is derived to push such cross-flows to the target values.

7. The method as in claim 6, in which said results of the use of the objective function is further refined by the use of a Jacobean Sensitivity Matrix of the cross-flow velocity.

8. The method as in claim 1, in which the perturbation of the system is obtained by shutting down the water to said waste paint scrubber while keeping the exhaust fan running at its current speed for obtaining said measurements.

9. The method as in claim 4, in which said control elements are speed adjustable fans, and adjustable flow dampers in each duct or opening between cells.

* * * * *